United States Patent [19]

Jalics et al.

[11] Patent Number: 5,342,896
[45] Date of Patent: Aug. 30, 1994

[54] COMB POLYMERS HAVING A HALOBUTYL RUBBER BACKBONE

[75] Inventors: George Jalics, Akron; Richard G. Bauer, Kent, both of Ohio

[73] Assignee: The Goodyear Tire & Rubber Company, Akron, Ohio

[21] Appl. No.: 47,638

[22] Filed: Jun. 10, 1993

Related U.S. Application Data

[62] Division of Ser. No. 749,787, Aug. 26, 1991, Pat. No. 5,221,716, which is a division of Ser. No. 498,676, Mar. 26, 1990, abandoned.

[51] Int. Cl.$^5$ .................. C08F 236/16; C08F 236/18
[52] U.S. Cl. ..................... 525/193; 525/313; 525/315; 525/250; 525/98; 525/99
[58] Field of Search ............... 525/191, 192, 193, 236, 525/237, 80, 99, 250, 315, 276, 292, 313

[56] References Cited

U.S. PATENT DOCUMENTS

| | | |
|---|---|---|
| 3,862,097 | 1/1975 | Milkovich et al. |
| 3,989,768 | 11/1976 | Milkovich et al. |
| 5,162,445 | 11/1992 | Powers et al. ............ 525/333.4 |

FOREIGN PATENT DOCUMENTS

| | | |
|---|---|---|
| 857965 | 12/1970 | Canada. |
| 052854 | 11/1981 | European Pat. Off. |
| 045816 | 2/1982 | European Pat. Off. |
| 887887 | 10/1960 | United Kingdom. |
| 1097997 | 6/1966 | United Kingdom. |
| 1174323 | 12/1969 | United Kingdom. |

OTHER PUBLICATIONS

Journal of Polymer Science: Part A-1, vol. 6, No. 10, Oct. 1968, pp. 2773-2783, Interscience Publishers, New York, US; Y. Minoura et al: "Reaction of chlorine-containing polymers with living polymers".

Primary Examiner—James J. Seidleck
Assistant Examiner—Mark L. Warzel
Attorney, Agent, or Firm—Alvin T. Rockhill

[57] ABSTRACT

The subject invention relates to comb polymers having a halobutyl rubber backbone and to techniques for synthesizing such polymers. The comb polymers of this invention can be thermoplastic elastomers. For instance, halobutyl rubbers having sidechains which are derived from vinyl aromatic monomers are thermoplastic elastomers which can be made by a technique of the subject invention. Such thermoplastic elastomers typically have a chlorobutyl rubber backbone and side chains which are comprised of polystyrene. The subject invention more specifically discloses a process for grafting a lithium terminated vinyl aromatic polymer onto a halobutyl rubber which comprises: (1) capping the lithium terminated vinyl aromatic polymer with a diene monomer to produce a lithium terminated diene capped vinyl aromatic polymer, and (2) reacting the lithium terminated diene capped vinyl aromatic polymer with the halobutyl rubber to produce a halobutyl rubber having vinyl aromatic sidechains grafted thereto.

14 Claims, No Drawings

COMB POLYMERS HAVING A HALOBUTYL RUBBER BACKBONE

This is a divisional application of Ser. No. 07/749,787, filed on Aug. 26, 1991 (now issued as U.S. Pat. No. 5,221,716), which is a divisional application of Ser. No. 07/498,676, filed on Mar. 26, 1990 (now abandoned).

BACKGROUND OF THE INVENTION

There are many potential uses for graft polymers having halobutyl rubber backbones. For instance, chlorobutyl rubber which has low air permeability and outstanding age resistance is incompatible with most rubbers commonly utilized in building tires. Chlorobutyl rubber is accordingly a highly desirable rubber for incorporation into tire compounds but is very difficult to cocure with other rubbers utilized in the tire compound. By grafting a polydiene rubber, such as polybutadiene, onto chlorobutyl rubber, the chlorobutyl rubber is compatibilized with most common rubbers utilized in building tires and can be very effectively cocured therewith.

Heretofore, it has been very difficult, if not impossible, to synthesize graft polymers having halobutyl rubber backbones. Prior attempts to graft polystyryl lithium onto chlorobutyl rubber have all resulted in failure. Prior to the subject invention, attempts to graft sidechains which are derived from diene monomers onto halobutyl rubber backbones have also resulted in enormous difficulties.

SUMMARY OF THE INVENTION

By practicing the techniques of this invention, vinyl aromatic sidechains and/or sidechains derived from diene monomers can be grafted onto halobutyl rubbers. For instance, sidechains which are derived from styrene can be grafted onto chlorobutyl rubber. Such graft polymers having polystyrene sidechains and a backbone which is comprised of chlorobutyl rubber are thermoplastic elastomers. These thermoplastic elastomers are highly useful in a wide variety of applications. The chlorobutyl rubber backbone provides these polymers with outstanding age resistance. Because chlorobutyl rubber and polystyrene are relatively inexpensive, graft polymers of this type can be prepared at only a fraction of the cost of conventional ABA-block thermoplastic elastomers. Such graft copolymers having chlorobutyl rubber backbones and polystyrene sidechains can also be blended with polyphenylene oxide to make very high performance blends.

The subject invention specifically discloses a process for grafting a lithium terminated vinyl aromatic polymer onto a halobutyl rubber which comprises: (1) capping the lithium terminated vinyl aromatic polymer with a diene monomer to produce a lithium terminated diene capped vinyl aromatic polymer, and (2) reacting the lithium terminated diene capped vinyl aromatic polymer with the halobutyl rubber to produce a halobutyl rubber having vinyl aromatic sidechains grafted thereto. Thus, by practicing the process of the subject invention, it is possible to make a thermoplastic elastomer which is comprised of a halobutyl rubber having sidechains grafted thereto, where said sidechains are derived from at least one vinyl aromatic monomer.

The present invention also reveals an elastomeric polymer which is comprised of a halobutyl rubber having sidechains grafted thereto, wherein said sidechains are derived from at least one diene monomer. For example, the present invention provides a process for preparing an elastomeric polymer having a halobutyl rubber backbone and 3,4-polyisoprene sidechains, said process being comprised of reacting a halobutyl rubber with lithium terminated 3,4-polyisoprene, wherein said lithium terminated 3,4-polyisoprene was made by the polymerization of isoprene monomer in the presence of tripiperidino phosphine oxide as a modifier. Typical polyisoprene rubbers synthesized with lithium initiators having cis-isomer contents of 60% to 85% can also be grafted to halobutyl rubbers.

The subject invention also provides a process for preparing an elastomeric polymer having a halobutyl rubber backbone and high vinyl-polybutadiene or medium vinyl polybutadiene sidechains, said process being comprised of reacting a halobutyl rubber with lithium terminated high vinyl polybutadiene or medium vinyl polybutadiene, wherein the lithium terminated polybutadiene was made by the polymerization of 1,3-butadiene monomer in the presence of potassium t-amylate as a modifier at a temperature of less than about 25° C.

High vinyl polybutadiene normally has a vinyl content of greater than 65%. Medium vinyl polybutadiene has a vinyl content of 35% to 60%. Unmodified lithium polybutadiene has a vinyl content of less than about 15%. In most cases unmodified polybutadiene made utilizing a lithium initiator has a vinyl content which is within the range of about 8% to about 10%. Unmodified lithium polybutadiene will also readily react with halobutyl rubbers to produce graft polymers having halobutyl rubber backbones and unmodified polybutadiene sidechains. Unmodified lithium polyisoprene and lithium styrene-butadiene rubber (SBR) also readily react with halobutyl rubber to make comb polymers.

DETAILED DESCRIPTION OF THE INVENTION

A halobutyl (halogenated butyl) rubber is utilized as the backbone in the graft polymers of this invention. Butyl rubbers are made by the copolymerization of isobutylene monomer with a small quantity of isoprene monomer. Butyl rubber is accordingly comprised of repeat units which are derived from isobutylene and isoprene. Such butyl rubber typically contains from about 0.5% to about 5% by weight isoprene and from about 95% by weight to about 99.5% by weight isobutylene. Butyl rubbers more typically contain from about 1 to about 3 weight percent isoprene and from about 97% to about 99% isobutylene. The halogenated butyl rubbers utilized in accordance with this invention are prepared by halogenating such butyl rubbers. A molar ratio of the halogen to double bonds in the butyl rubber of approximately 1:1 is typically utilized in such halogenation procedures. Halobutyl rubbers can be prepared by halogenating butyl rubber with any halogen. In most cases, the butyl rubber will be halogenated with fluorine, chlorine or bromine.

In the practice of this invention chlorobutyl rubbers and bromobutyl rubbers will typically be utilized. These halobutyl rubbers will normally have a number average molecular weight which is within the range of about 100,000 to about 500,000. In most cases, it is preferred to utilize a halobutyl rubber having a molecular weight which is within the range of about 300,000 to about 350,000. Such halobutyl rubbers will typically contain from about 50 to about 100 halogen atoms per polymer chain in the rubber. In most cases, the halobutyl rubber will contain from about 0.5 to about 5 weight percent of the halogen. In most cases, it is preferred for the halobutyl rubber to contain from about 0.75 to about 3 weight percent of the halogen. It is typically most preferred for the halobutyl rubber to contain from about 1% to about 2% of the halogen. Such halobutyl rubbers are commercially available from Exxon Chemical Company and Polysar Limited. Such representative examples of commercially available halobutyl rubbers which can be employed include: Exxon Chlorobutyl 1065, Exxon Chlorobutyl 1066, Exxon Chlorobutyl 1068, Polysar Chlorobutyl 1240, Polysar Chlorobutyl 1255, Exxon Bromobutyl 2222, Exxon Bromobutyl 2233, Exxon Bromobutyl 2244, Exxon Bromobutyl 2255, Polysar Bromobutyl X2, and Polysar Bromobutyl 2030.

The grafting procedure required varies with the type of sidechain being grafted onto the halobutyl rubber. In other words, the conditions required for the grafting procedure will vary with the type of sidechain being grafted onto the halobutyl rubber.

In cases where vinyl aromatic polymers are grafted onto halobutyl rubbers, a very special procedure must be employed. In this procedure, the vinyl aromatic polymer must be capped with a diene monomer before it is grafted onto the halobutyl rubber. Such diene monomer capped vinyl aromatic polymers can be prepared by simply adding a small amount of diene monomer to a solution of living lithium terminated polystyrene. It is only necessary to utilize enough of the diene monomer to cause the orange (styryl) color of the living lithium terminated polystyrene solution to disappear. It is believed that it is only necessary for the polystyrene chain to be capped with 1 diene monomer. Of course, greater quantities of the diene monomer can be utilized. However, there is not believed to be any advantage associated with the utilization of excess quantities of diene monomer. Any diene monomer can be utilized in the capping procedure. However, in most cases 1,3-butadiene or isoprene will be utilized. This capping reaction proceeds very rapidly at room temperature.

In the capping procedure living lithium terminated polystyrene is capped with a diene monomer to produce a lithium terminated diene capped vinyl aromatic polymer. This reaction can be depicted as follows:

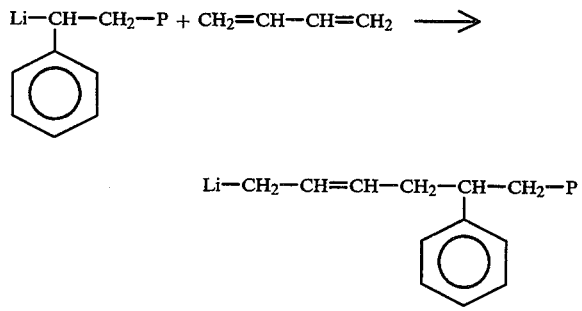

wherein P illustrates the polymer chain.

In the reaction depicted lithium terminated polystyrene chains react with 1,3-butadiene monomer to produce a lithium terminated butadiene capped polystyrene. The capping reaction is typically carried out in an inert organic solvent, such as cyclohexane, hexane, benzene or toluene. It is normally advantageous for the capping procedure to be carried out under an inert atmosphere, such as nitrogen.

A wide variety of vinyl aromatic polymers can be grafted onto halobutyl rubbers utilizing the technique of this invention. For example, polystyrene, polyvinyl toluene, poly-α-methylstyrene, and α-methylstyrene can be grafted onto halobutyl rubbers to make useful thermoplastic elastomers. These vinyl aromatic polymers will typically have number average molecular weights which are within the range of about 500 to about 500,000. More typically, the vinyl aromatic polymers will have molecular weights which are within the range of about 1,000 to about 100,000. It is normally preferred for the vinyl aromatic polymer to have a number average molecular weight which is within the range of about 3,000 to about 40,000. These lithium terminated vinyl aromatic polymers can be made utilizing standard procedures which are well known to those skilled in the art. They are typically made by the solution polymerization of styrene monomer with a lithium catalyst being employed. A wide variety of lithium catalysts can be employed.

The lithium catalysts which can be used are typically organolithium compounds. Organo monolithium compounds, such as alkyllithium compounds and aryllithium compounds, are usually employed. Some representative examples of organo monolithium compounds that can be utilized include ethyllithium, isopropyllithium, n-butyllithium, secondary-butyllithium, normal-hexyllithium, tertiary-octyllithium, phenyllithium, 2-napthyllithium, 4-butylphenyllithium, 4-phenylbutyllithium, cyclohexyllithium and the like. Normal-butyllithium and secondary-butyllithium are highly preferred lithium catalysts.

The amount of lithium catalyst utilized will vary from one organolithium compound to another and with molecular weight that is desired for the polystyrene being synthesized. As a general rule, from about 0.01 phm (parts per hundred parts by weight of monomer) to phm of the lithium catalyst will be employed. In most cases, from 0.01 phm to 0.1 phm of the lithium catalyst will be employed with it being preferred to utilize 0.025 phm to 0.07 phm of the lithium catalyst.

The lithium terminated diene capped vinyl aromatic polymer will readily react with the halobutyl rubber. It is important to add the solution of the lithium terminated diene capped vinyl aromatic polymer to a solution of the halobutyl rubber. It is not desirable to revert this order of addition because the first halobutyl rubber added to the solution of lithium terminated diene capped vinyl aromatic polymer would be very highly grafted with the rubber added subsequently being only very lightly grafted.

The temperature at which this grafting procedure is carried out is not particularly critical. In fact, the grafting reaction proceeds very rapidly at room temperature (about 18° C. to about 26° C.). However, in the case of α-methylstyrene containing vinyl aromatic polymers, it is important to maintain a temperature below about 60° C. This is important because α-methylstyrene polymers can rapidly depolymerize at temperatures above about 60° C.

The solution of halobutyl rubber will normally be scavenged with an organolithium compound before the grafting procedure is carried out to prevent gelation. The halobutyl rubber solution will typically be scavenged with a very dilute solution of a normal alkyllithium compound. Normal-butyllithium is preferred as a scavenger. Secondary-butyllithium does not yield satisfactory results. The normal-alkyllithium solution employed will typically contain 5 weight percent n-alkyllithium or less based upon the total weight of the solution. In most cases from about 0.5 to about 3% n-alkyllithium will be in the scavenger solution. It is typically preferred for the scavenger solution to contain from about 1 to about 2% of the n-alkyllithium compound. In the case of a 10% halobutyl rubber cement, about 10 ml of the n-alkyllithium solution will be needed per 100 ml of the halobutyl rubber cement. The halobutyl rubber cement will typically have a solids content which is within the range of about 2 to about 30 weight percent. It is normally preferred for the halobutyl rubber solution to contain from about 5 to about 20 weight percent of the halobutyl rubber. It is normally most preferred for the halobutyl rubber cement to contain from about 10 to about 15 weight percent of the halobutyl rubber.

To produce a graft polymer which is a thermoplastic elastomer, it will typically be necessary to incorporate from about 10 to about 40 weight percent of the vinyl aromatic polymer into the graft polymer. In most cases, it is preferred to incorporate from about 15 weight percent to about 35 weight percent of the vinyl aromatic polymer into the graft polymer.

The graft copolymers of this invention having halobutyl rubber backbones and vinyl aromatic sidechains can be blended with polyphenylene oxide to improve the impact strength thereof. Polyphenylene oxide is a widely used engineering plastic having a very high surface temperature. Without modification, polyphenylene oxide melts at about 250° C. and is extremely brittle. The very high temperature required to process polyphenylene oxide can be reduced by blending it with polystyrene since both of these polymers exhibit the unusual feature of being fully soluble in each other at any ratio. Unfortunately, such blends of polyphenylene oxide and polystyrene are also brittle, since both of these polymers are brittle by themselves. However, when the graft polymers of this invention having halobutyl rubber backbones and polystyrene sidechains are mixed with polyphenylene oxide, a matrix is formed wherein the brittle polyphenylene oxide-polystyrene domains are linked with elastomeric halobutyl rubber segments. Such blends exhibit the properties of tough, reinforced engineering plastics. The amount of graft copolymers utilized in such blends will typically be adequate to give the overall blend a halobutyl rubber content which is within the range of about 4 to about 25 weight percent. Such blends will more typically contain from about 6 to about 15 weight percent halobutyl rubber based upon the total weight of the blend. The graft copolymers utilized in such blends can be thermoplastic elastomers or nonelastomeric (hard) plastics.

Halobutyl rubbers provide low air permeability and outstanding age resistance. These are characteristics which are often sought in tire rubbers. However, the addition of halobutyl rubbers to most standard diene rubbers, such as polyisoprene and polybutadiene, by conventional techniques yields blends which exhibit improved age resistance, but which are deficient in flex, tear, tensile strength and adhesion to other higher components. Thus, it has not been possible to achieve the desired characteristics of halobutyl rubbers by simply blending them into standard tire compounds.

By utilizing the techniques of this invention, it is possible to graft polydiene rubber sidechains onto halobutyl rubbers. The elastomeric graft polymers which result can be blended into standard tire rubber compounds to attain improved air permeability and age resistance without sacrificing flex, tear, tensile strength or adhesion to other tire components. Additionally, such blends exhibit good cocurability an can be utilized in building tires which display improved traction and rolling resistance.

Lithium terminated 3,4-polyisoprene can be grafted onto halobutyl rubber. It is important for the 3,4-polyisoprene to be synthesized by the polymerization of isoprene utilizing a lithium catalyst. This will result in the 3,4-polyisoprene being lithium terminated. It is also important for the 3,4-polyisoprene to be synthesized in the presence of tripiperidinophosphine oxide as a modifier. The lithium terminated 3,4-polyisoprene made by the polymerization of isoprene in the presence of tripiperidinophosphine oxide can be readily grafted onto halobutyl rubbers by simply mixing a solution of the lithium terminated 3,4-polyisoprene into a solution, containing the halobutyl rubber. This grafting reaction occurs very rapidly at ambient temperature.

High vinyl polybutadiene and medium vinyl polybutadiene sidechains can also be grafted onto halobutyl rubber utilizing the techniques of this invention. The high vinyl polybutadiene or medium vinyl polybutadiene utilized will be lithium terminated. It is accordingly synthesized with a lithium catalyst. In the case of high vinyl polybutadiene and medium vinyl polybutadiene, it is important to utilize potassium t-amylate as the modifier. Accordingly, the high vinyl polybutadiene or medium vinyl polybutadiene will be prepared by the polymerization of 1,3-butadiene monomer in the presence of potassium t-amylate. It is also important to prepare the high vinyl polybutadiene or medium vinyl polybutadiene at a polymerization temperature of less than about 35° C. The polymerization temperature employed will normally be within the range of about $-10°$ C. to about 90° C. with temperatures in the range of about 10° C. to 20° C. being preferred. The lithium terminated high vinyl polybutadiene or lithium terminated medium vinyl polybutadiene can readily be grafted onto halobutyl rubbers. This grafting procedure can be carried out by simply mixing a solution containing the high vinyl polybutadiene or medium vinyl polybutadiene into a solution containing the halobutyl rubber. This grafting reaction occurs very rapidly at room temperature.

Unmodified polybutadiene synthesized with a lithium initiator can also be grafted onto halobutyl rubbers utilizing the techniques of this invention. This type of grafting results in the formation of comb polymers having halobutyl rubber backbones and unmodified polybutadiene sidechains which have vinyl contents of less than 15%. Such a grafting procedure can be carried out by simply mixing a solution containing the unmodified polybutadiene into a solution containing the halobutyl rubber. Unmodified polyisoprene made with a lithium initiator and SBR made with a lithium initiator can also be grafted onto halobutyl rubbers to make comb polymers.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

In this experiment a thermoplastic elastomer having a chlorobutyl rubber backbone and polystyrene sidechains was prepared. In the procedure utilized, a solution containing 700 ml of cyclohexane and 100 ml of styrene was passed through silica and charged into a quart (946 ml) polymerization bottle under nitrogen. Then, 2.5 ml of a 1.25M solution of s-butyllithium was added to initiate the polymerization which was carried out at a temperature of 50° C. for three hours. This resulted in the synthesis of lithium terminated polystyrene. The lithium terminated polystyrene was capped with butadiene upon cooling by adding 20 ml of a 15% solution of 1,3-butadiene in hexane. After the 1,3-butadiene solution was injected into the polystyrene solution, the orange colored cement turned bright yellow. Thus, enough butadiene was added to cause the orange (styryl) color to disappear.

The solution of the lithium terminated butadiene capped polystyrene was subsequently added to 1.5 liters of 20 weight percent solution of chlorobutyl rubber in cyclohexane. This addition was done under a nitrogen atmosphere. The chlorobutyl rubber cement was previously scavenged with 150 ml of a 0.1M lithiumoligobutadiene (molecular weight less than about 1000) solution. To carry out this grafting procedure, solubility is extremely important. If the combined cements are not fully soluble in each other, then the extent of grafting will be extremely limited. Using cyclohexane as the solvent for the polystyrene is satisfactory. Cyclohexane is a preferred solvent for the chlorobutyl rubber. Hexane may also be utilized as the solvent for the chlorobutyl rubber, but toluene should be added to increase overall solubility.

Utilizing the same general procedure, a series of graft polymers having chlorobutyl rubber backbones and polystyrene sidechains were synthesized. The series of polymers synthesized in this series of experiments and their properties are described in Table I. A series of graft polymers having a ratio of chlorobutyl rubber to polystyrene of 38:62 was prepared. The polystyrene utilized in making these graft polymers had molecular weights ranging from about 10,000 to about 500,000.

The graft polymers prepared varied on the average number of sidechains from less than 1 to 24. At 10,000 (24 teeth), the polymer was rigid but clear. The polymers became flexible at 28,000 (8 teeth) and were extremely hard at 100,000 (2.4 teeth). The polymers softened at molecular weights of 150,000 and higher (2 or less teeth).

In the next series of experiments, graft polymers having a ratio of chlorobutyl rubber to polystyrene of 60:40 were prepared. Startling results were observed in this series of experiments. In cases where the molecular weight of the polystyrene sidechains was 12,000 (16 teeth), the polymer was clear, with some stiffness. As the molecular weight of the polystyrene sidechains was increased to 28,000 (7 teeth), the polymer became rubbery and self-reinforcing. This observation was extremely surprising because even though it was recognized that equal molecular weight polystyrene grafts could fulfill the role of the hard blocks in ABA-type thermoplastic elastomers, there is no control over the length of the soft segments between the hard segments as is required in ABA-type thermoplastic elastomers. In fact, the actual distribution of the isoprene units with its allylic chlorine groups along the butyl rubber chain is not known. All that is known is that the average chlorobutyl rubber molecule has a molecular weight of approximately 350,000 with about 80 to 100 allylic chlorine atoms, which puts the average segment of polymer between 2 chlorine atoms around 3,500 molecular weight (assuming an even distribution).

Following the discovery of self-reinforcement, the range of this phenomena was explored. The window of self-reinforcement turned out to be quite large. The chlorobutyl rubber/polystyrene ratio extends approximately from 90:10 to 60:40 with the polystyrene teeth molecular weight ranging from about 5,000 to about 40,000, and the number of teeth (sidechains) ranging from 3 to about 30.

TABLE I

Comb Structured Graft Polymers with Chlorobutyl Rubber Backbones and Polystyrene Sidechains (Teeth) with CB/PS Ratios from 38/62 to 88/12 and Sidechain Molecular Weights of 10,000 to 500,000. Tensile strips were cast from CH$_2$Cl$_2$ Solution

| Chlorobutyl/ Polystyrene | Teeth M Wt. | Approx. # of Teeth | Rigidity | Appearance | % of Grafted Phase by GPC | Tensile Strength | Elongation % | Molulus % Yield | Modulus 100% | Modulus 300% | Modulus 500% |
|---|---|---|---|---|---|---|---|---|---|---|---|
| 38/62 | 10,000 | 24 | Rigid | Almost Clear | 77 | | | | | | |
| 38/62 | 28,000 | 8 | Flexible | Cloudy | 84 | | | | | | |
| 38/62 | 29,000 | 8 | Flexible | Cloudy | 79 | | | | | | |
| 38/62 | 38,000 | 7 | Flexible | Cloudy | 73 | | | | | | |
| 38/62 | 100,000 | 2 | Hard Plastic | Cloudy | 57 | | | | | | |
| 38/62 | 150,000 | 2 | Leather Like | Cloudy | 55 | | | | | | |
| 38/62 | 300,000 | 1 | Leather Like | Cloudy | — | | | | | | |
| 38/62 | 500,000 | 1 | Leather Like | Cloudy | — | | | | | | |
| 60/40 | 12,000 | 16 | Some Stiffness | Clear | 86.5 | 2027 | 700 | 730 | 559 | 802 | 1324 |
| 60/40 | 28,000 | 7 | | Clear | 80.1 | 1725 | 710 | 550 | 450 | 707 | 1107 |
| 60/40 | 40,000 | 5-6 | V Strong | Hazy | 85 | 1566 | 670 | 605 | 454 | 704 | 1072 |
| 60/40 | 64,000 | 3 | V Strong Soft | Sl Cloudy | 75 | 1482 | 710 | 647 | 565 | 735 | 1112 |
| 60/40 | 75,000 | 2.5 | Shappy | Cloudy | 63 | | | | | | |
| 60/40 | 100,000 | 2 | Some Strength | Cloudy | 54 | | | | | | |
| 60/40 | 150,000 | 1.3 | Soft No Strength | Cloudy | 49 | | | | | | |
| 70/30 | 4,000 | 32 | | | 74.5 | 1603 | 890 | 160 | 224 | 462 | 744 |
| 70/30 | 6,000 | 21 | Some Stiffness | Sl Haze | 88 | 1973 | 870 | 479 | 349 | 575 | 918 |
| 70/30 | 15,000 | 8.5 | V Strong | Cloudy | 50 | 1784 | 1020 | 151 | 165 | 309 | 540 |
| 70/30 | 26,000 | 5 | V Strong | Clear | 86 | 1669 | 830 | 388 | 295 | 518 | 842 |
| 75/25 | 15,000 | 6-7 | V Strong | Hazy | 80 | | | | | | |
| 80/20 | 25,000 | 2.4 | | Cloudy | 85.8 | 1168 | 1092 | 77 | 161 | 265 | 431 |
| 78/22 | 12,000 | 7 | | Clear | 84.7 | 1620 | 1020 | 109 | 131 | 255 | 431 |

TABLE I-continued

Comb Structured Graft Polymers with Chlorobutyl Rubber Backbones and Polystyrene Sidechains (Teeth) with CB/PS Ratios from 38/62 to 88/12 and Sidechain Molecular Weights of 10,000 to 500,000. Tensile strips were cast from $CH_2Cl_2$ Solution

| Chlorobutyl/ Polystyrene | Teeth M Wt. | Approx. # of Teeth | Rigidity | Appearance | % of Grafted Phase by GPC | Tensile Strength | Elongation % | Molulus % Yield | Modulus 100% | Modulus 300% | Modulus 500% |
|---|---|---|---|---|---|---|---|---|---|---|---|
| 78/22 | 6,000 | 14 | | Clear | 84.1 | 1681 | 1020 | 111 | 151 | 313 | 465 |
| 88/12 | 6,000 | 7 | | Clear | 95 | 1930 | 390 | 552 | 498 | 1030 | 0 |
| 88/12 | 12,000 | 3.5 | | Hazy | 96 | 1750 | 1180 | 0 | 54 | 128 | 230 |

The graft polymers exhibiting self-reinforcing characteristics were dissolved in methylene chloride and films were cast from them on stretched cellophane. After allowing several days for drying, the stress-strain properties reported in Table I were determined. The stress-strain characteristics of these polymers compare very favorably with those of Kraton ™ G 1650, a commercially available hydrogenated styrene-polydiene block copolymer, which was evaluated for purposes of comparison. The best tensile strength of the graft copolymers made is very comparable to that of the Kraton ™ control. However, the graft polymer made had an elongation which was approximately twice that of the styrene-polydiene block copolymer.

EXAMPLE 2

In this experiment graft polymers having chlorobutyl rubber backbones and polystyrene sidechains were blended with polyphenylene oxide. In the procedure utilized, 184.5 grams of polyphenylene oxide was mixed with 65.75 g of the graft polymer in a Brabender mixer above the flexing temperature. The hard plastic was cut with a band saw into pieces no longer than 1 inch (2.54 cm) and ground in a grinder with excess dry ice to increase brittleness. The powder obtained was subsequently molded into 0.25 inch (6.35 mm) sheet from which half inch (12.7 mm) strips were cut with a band saw. The strips were then tested for izod impact strength utilizing ASTM Test Procedure D 256-56 (1961).

A series of blends were prepared utilizing the graft polymers described in Example 1 having a ratio of chlorobutyl rubber to polystyrene of 38:62. These graft polymers had polystyrene segment molecular weights ranging from 10,000 to 300,000. The number of polystyrene sidechains in these polymers varied from less than 1 to about 24. The level of graft polymer utilized in the blends was chosen so as to give an overall rubber content of about 10%. In other words, about 10% of the overall weight of the blend was attributable to the chlorobutyl rubber in the graft polymer with about 90% of the overall weight of the blend being attributable to the polystyrene sidechains in the graft copolymer and the polyphenylene oxide. As a control, unblended polyphenylene oxide was tested for izod impact strength. A modified polyphenylene oxide engineering plastic (Noryl EN 265) was also tested for izod impact strength for purposes of comparison. Noryl EN 265 is a commercially available engineering plastic which is widely used in manufacturing housings for computers and other business equipment.

The data obtained and reported in Table II shows that the izod impact strength of polyphenylene oxide is very poor. The impact strength of the commercially available modified polyphenylene oxide is much better. However, even higher impact strengths can be realized by blending polyphenylene oxide with the graft polymers of this invention.

TABLE II

Impact Strength of Various Blends of Chlorobutyl Rubber/ Polystyrene Graft Polymers with Polyphenylene Oxide

| | | | Izod Impact Data | | | |
|---|---|---|---|---|---|---|
| | | | Gauge (Inches) | Inch Lbs. | Foot Lbs. per Inch of Face | Average |
| Controls | | | | | | |
| Noryl EN-265 | | | .235 | .800 | 3.40 | |
| | | | .229 | .875 | 3.83 | |
| | | | .231 | .750 | 3.24 | 1.5 |
| | | | .230 | .850 | 3.70 | |
| | | | .232 | .775 | 3.34 | |
| Polyphenylene Oxide (unblended) | | | .249 | .475 | 1.90 | |
| | | | .247 | .400 | 1.62 | |
| | | | .249 | .375 | 1.50 | 1.49 |
| | | | .250 | .200 | .80 | |
| | | | .247 | .400 | 1.62 | |
| Graft Polymers | | | | | | |
| Approx. "Teeth" M Wt | Approx. # of "Teeth" | % Grafted Phase | | | | |
| 38,000 | 7 | 73 | .233 | .825 | 3.54 | |
| | | | .233 | .700 | 3.00 | |
| | | | .231 | 1.375 | 5.95 | 4.09 |
| | | | .230 | 1.000 | 4.34 | |
| | | | .234 | .850 | 3.63 | |
| 28,000 | 8 | 84 | .240 | .875 | 3.64 | |
| | | | .235 | 1.10 | 4.68* | |
| | | | .234 | 1.000 | 4.27 | 4.65 |

TABLE II-continued

Impact Strength of Various Blends of Chlorobutyl Rubber/
Polystyrene Graft Polymers with Polyphenylene Oxide

| | | | Izod Impact Data | | | |
|---|---|---|---|---|---|---|
| | | | Gauge (Inches) | Inch Lbs. | Foot Lbs. per Inch of Face | Average |
| | | | .241 | 1.750 | 7.26* | |
| | | | .229 | .775 | 3.38 | |
| 29,000 | 8 | 79 | .244 | .800 | 3.28 | |
| | | | .240 | .775 | 3.22 | |
| | | | .234 | .500 | 2.14 | 2.90 |
| | | | .237 | .775 | 2.84 | |
| | | | .241 | .725 | 3.00 | |
| 10,000 | 24 | 77 | .241 | .675 | 2.80 | |
| | | | .236 | .700 | 2.96 | |
| | | | .249 | .650 | 2.61 | 2.62 |
| | | | .231 | .600 | 2.60 | |
| | | | .236 | .550 | 2.33 | |
| 100,000 | 2.4 | 57 | .231 | .550 | 2.38 | |
| | | | .229 | .700 | 3.06 | |
| | | | .229 | .700 | 3.06 | |
| | | | .228 | .725 | 3.18 | |
| | | | .231 | .700 | 3.03 | |
| 150,000 | 2 | 55 | .232 | .400 | 1.72 | |
| | | | .231 | .350 | 1.52 | |
| | | | .236 | .250 | 1.06 | 1.50 |
| | | | .238 | .400 | 1.68 | |

As can be seen by reviewing Table II, the highest impact strength (not average) attained was 7.26 foot pounds per inch of face which is almost twice the best value achieved utilizing Noryl EN 265. Since in these sample preparations, optimum conditions were not likely to be achieved, due to lack of proper mixing and molding equipment, maximum readings may be more significant than statistical averages. Moreover, the fact that the two highest readings on the sample did not break completely, but held together after the break (hinge break) also indicate that they were superior to the other examples which broke completely. The reinforcing power of the grafted comb polymers was highest when the sidechains had a molecular weight of about 28,000 (8 polystyrene teeth per chlorobutyl rubber molecule) and 84% grafted phase level. With higher polystyrene teeth molecular weights (150,000) and fewer teeth and lower grafting efficiency (grafted phase 55%), impact strength of the blend was equivalent to unmodified polyphenylene oxide.

EXAMPLE 3

In this experiment, a comb polymer having a chlorobutyl rubber backbone and medium vinyl polybutadiene sidechains was prepared. In the procedure used, 750 ml of a premix solution containing 15% 1,3-butadiene in hexane was charged into a quart (946 ml) polymerization bottle under nitrogen. As a modifier, 0.75 ml of a 1.1M solution of potassium t-amylate was added. Then, 1.75 ml of a 1.3M solution of secondary-butyl lithium in hexane was added to initiate the polymerization. The polymerization was carried out at a temperature of about 15° C. for about 4 hours. Full conversion was confirmed by solids measurement. The molar ratio of the secondary-butyl lithium initiator to the potassium t-amylate was 0.27. However, in such polymerizations medium vinyl polybutadiene can be made utilizing any molar ratio of the lithium initiator to potassium t-amylate which is within the range of about 0.1:1 to about 1:1. In most cases, the medium vinyl polybutadiene will be synthesized using a molar ratio of lithium initiator to potassium t-amylate which is within the range of about 0.15 to about 0.60. The solution of the medium vinyl polybutadiene was added to 750 ml of a chlorobutyl rubber solution which contained 100 g of polymer per liter of hexane. The chlorobutyl rubber cement was previously scavenged under nitrogen with 7.5 ml of a 1.6M solution of n-butyllithium which was diluted with 75 ml of hexane. GPC confirmed that the grafting reaction of this experiment was virtually quantitative.

EXAMPLE 4

A comb polymer having a chlorobutyl rubber backbone and 3,4-polyisoprene sidechains was made in this experiment. In the procedure employed, 625 ml of hexane, 110 g of isoprene, 4 ml of a 1.3M solution of secondary-butyl lithium in hexane, and 8.75 ml of a 0.2M solution of tripiperidinophosphine oxide in hexane were charged into a quart (946 ml) bottle. The polymerization was carried out at a temperature of 15° C. for about 4 hours. Full conversion was confirmed by solids measurement. The molar ratio of secondary butyl lithium to tripiperidinophosphine oxide employed in this experiment was 0.3. However 3,4-polyisoprene can be made utilizing any molar ratio of lithium initiator to tripiperidinophosphine oxide which is within the range of about 0.15:1 to about 0.60:1. The grafting was carried out as described in Example 3. GPC showed that a very high degree of grafting was attained.

EXAMPLE 5

In this experiment a graft polymer having a chlorobutyl rubber backbone and SBR sidechains was prepared. In the procedure employed, 750 ml of a premix solution containing 15% butadiene in hexane, 17 g of styrene, 4 ml of a 1.3M solution of secondary-butyl lithium in hexane, and 0.75 ml of a 1.1M solution of potassium t-amylate in hexane were charged into a quart (946 ml) polymerization bottle. The polymerization was carried out at a temperature of 45° C. for about 4 hours. Full conversion was confirmed by Solids measurement. In this experiment, the molar ratio of the secondary-butyllithium initiator to potassium t-amylate was 0.6. However, in making SBR any molar ratio of the lithium initiator to potassium t-amylate which is within the range of about 0.2:1 to about 1.4:1 can be employed. The polymerization temperature utilized in making such SBR can range from about −10° C. to about 90° C. Temperatures of about 20° C. to about 70° C. are generally preferred.

The grafting was carried out as described in Example 3. GPC analysis showed that the grafting reaction was essentially quantitative. After employing the grafting techniques of this invention, it is often impossible to detect the presence of lithium polymer precursers. Lower levels of grafting may, of course, be attained by reducing the scavenge level. However, in most cases, it will be desirable to achieve a high level of grafting.

While certain representative embodiments and details have been shown for the purpose of illustrating the present invention, it will be apparent to those skilled in this art that various changes and modifications can be made therein without departing from the scope of the present invention.

What si claimed is:

1. A process for grafting a lithium terminated vinyl aromatic polymer onto a halobutyl rubber which comprises: (1) capping the lithium terminated vinyl aromatic polymer with a diene monomer to produce a lithium terminated diene capped vinyl aromatic polymer, and (2) reacting the lithium terminated diene capped vinyl aromatic polymer with the halobutyl rubber to produce a halobutyl rubber having vinyl aromatic sidechains grafted thereto.

2. A process for preparing a thermoplastic elastomer having a halobutyl rubber backbone and vinyl aromatic polymer sidechains, said process being comprised of reacting a halobutyl rubber with at least one lithium terminated diene capped vinyl aromatic polymer.

3. A process as specified in claim 1 wherein the halobutyl rubber is selected from the group consisting of bromobutyl rubbers and chlorobutyl rubbers.

4. A process as specified in claim 3 wherein the vinyl aromatic polymer is selected from the group consisting of polystyrene, polyvinyltoluene and poly-α-methylstyrene.

5. A process as specified in claim 4 wherein the halobutyl rubber has a number average molecular weight which is within the range of about 100,000 to about 500,000.

6. A process as specified in claim 5 wherein the halobutyl rubber contains from about 0.75 weight percent to about 3 weight percent of the halogen.

7. A process as specified in claim 6 wherein the vinyl aromatic polymer is polystyrene.

8. A process as specified in claim 7 wherein the vinyl aromatic polymer is capped with 1,3-butadiene or isoprene.

9. A process as specified in claim 8 wherein the vinyl aromatic polymer has a number average molecular weight which is within the range of about 1,000 to about 100,000.

10. A process as specified in claim 9 wherein the halobutyl rubber has a number average molecular weight which is within the range of about 300,000 to about 350,000.

11. A process as specified in claim 10 wherein the vinyl aromatic polymer has a number average molecular weight which is within the range of about 3,000 to about 40,000.

12. A process as specified in claim 11 wherein the halobutyl rubber contains from about 1 weight percent to about 2 weight percent of the halogen.

13. A process as specified in claim 12 wherein the halobutyl rubber is a chlorobutyl rubber.

14. A process as specified in claim 12 wherein the halobutyl rubber is bromobutyl rubber.

* * * * *